United States Patent [19]

Siegel

[11] Patent Number: 4,736,391

[45] Date of Patent: Apr. 5, 1988

[54] THRESHOLD CONTROL WITH DATA RECEIVER

[75] Inventor: Stefan A. Siegel, Middlesex County, N.J.

[73] Assignee: General Electric Company, Schenectady, N.Y.

[21] Appl. No.: 887,919

[22] Filed: Jul. 22, 1986

[51] Int. Cl.$^4$ .............................................. H04L 25/06
[52] U.S. Cl. ......................................... 375/76; 330/11; 328/149
[58] Field of Search ................... 375/76; 307/355, 356, 307/357, 358, 359; 455/608; 328/149; 330/11

[56] References Cited

U.S. PATENT DOCUMENTS

| | | | |
|---|---|---|---|
| 3,832,577 | 8/1974 | Harr | 375/76 |
| 3,846,710 | 11/1974 | Chapman | 375/76 |
| 3,947,769 | 3/1976 | Rousos et al. | 325/320 |
| 4,029,904 | 6/1977 | Papeschi | 375/76 |
| 4,054,842 | 10/1977 | Elliott | 375/76 |
| 4,091,297 | 5/1978 | Stephens | 307/353 |
| 4,175,256 | 11/1979 | Dolikian | 307/358 |
| 4,219,745 | 8/1980 | Hersman | 305/358 |
| 4,236,256 | 11/1980 | Brackett et al. | 455/608 |
| 4,257,125 | 3/1981 | Theall, Jr. | 455/608 |
| 4,318,128 | 3/1982 | Sauvanet | 307/359 |
| 4,414,659 | 11/1984 | Beckers | 375/76 |
| 4,433,256 | 2/1984 | Dolikian | 307/359 |
| 4,479,266 | 10/1984 | Eumurian et al. | 455/608 |
| 4,540,897 | 9/1985 | Takaoka et al. | 375/76 |
| 4,622,586 | 11/1986 | Megeid | 358/153 |

FOREIGN PATENT DOCUMENTS 2730057 1/1979 Fed. Rep. of Germany.

Primary Examiner—Robert L. Griffin
Assistant Examiner—Stephen Chin
Attorney, Agent, or Firm—Marvin Snyder; Fred Jacob; Harley R. Ball

[57] ABSTRACT

A binary data receiver data modulated light signals and applies them to a photodetector for producing electrical data signals which are amplified and applied to a data decision circuit. The data decision circuit compares the instantaneous value of the amplified data signals with a fixed threshold to determine if a logic high or low level is received. A portion of the signal path between the photodetector and the data decision circuit is ac coupled, whereby the moment-to-moment variations of duty cycle of the signal due to the information content of the data causes variations in the peak excursions of the signal which may adversely affect the data decisions or processing of the data. Open-circuit correction of the average value is accomplished by a correction signal generator which receives an ac coupled data sample, and rectifies both positive-going and negative-going excursions relative to ground to produce positive and negative average value signals. The positive and negative average value signals are summed to produce a correction signal. The correction signal is either added to the ac coupled signal or controls the output offset voltage of a signal amplifier to correct the information-depending average-value variations at the data decision circuit.

7 Claims, 6 Drawing Sheets

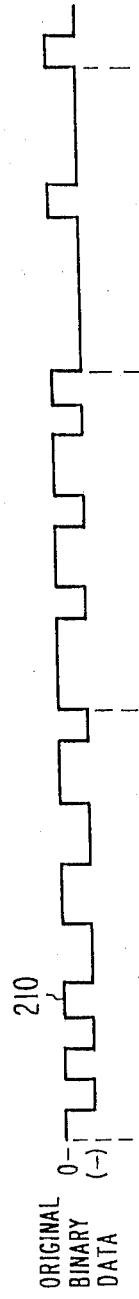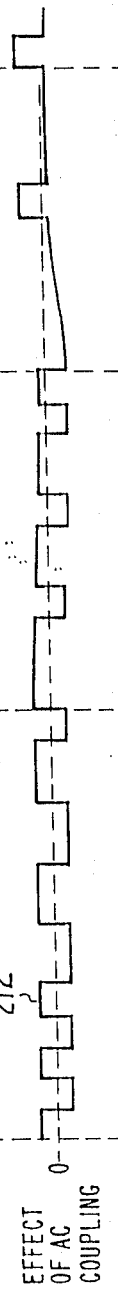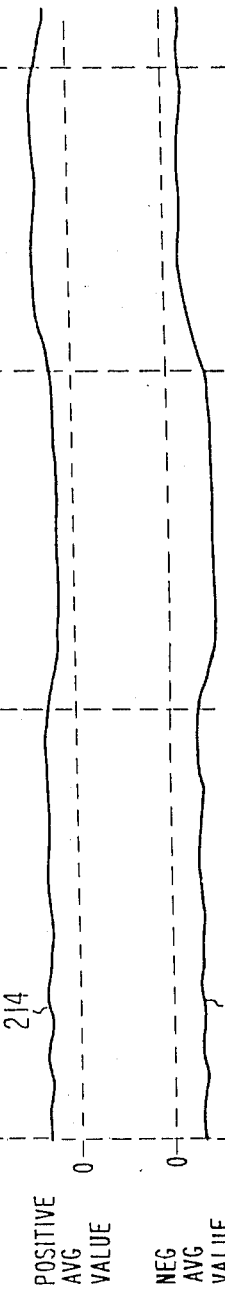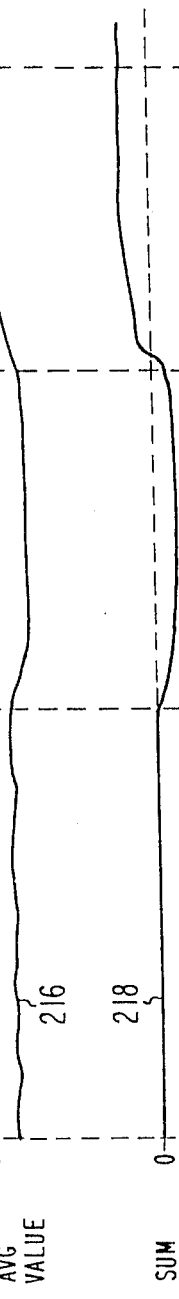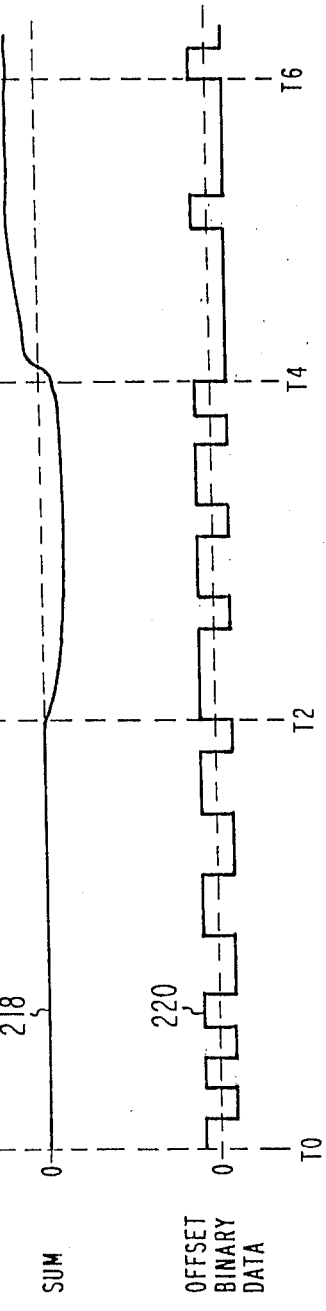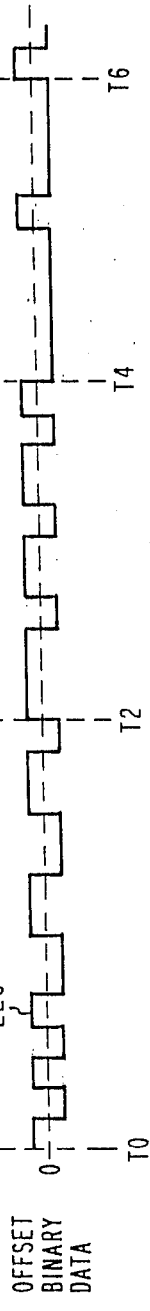

THRESHOLD CONTROL WITH DATA RECEIVER

This invention relates to ac coupled data receivers and more particularly to threshold controls for compensating for the effects of duty cycle variations of ac coupled binary data.

BACKGROUND OF THE INVENTION

Fundamental goals in a digital receiver for a digital communication system are to minimize the amount of received power required in order to achieve a given bit error rate (BER), and to maximize the data throughput (achieve maximum bandwidth). For example, in an optical fiber communication system, each receiver includes a photodetector which detects the incident light signal with its data encoding and converts it into a small electrical current. A low-noise amplifier or preamplifier following the photodetector amplifies the photodetector current to produce a usable signal while introducing a minimum amount of excess noise. The signal at the output of the amplifier is applied to a digital regenerator or bit decision circuit (also sometimes known as a slicer) in order to determine at each moment whether a logic zero (logic low) or a logic one (logic high) is being received. The bit decision circuit is basically a comparator which compares the instantaneous value of the signal voltage with a threshold voltage representing the transition between a logic low level and a logic high level, and establishes the logic level depending upon whether the signal voltage is high or low relative to the threshold voltage.

It may be desirable to ac (alternating-current) couple the signal from the photodiode or other detector to the data decision circuit. The term "ac" applies not only to current but also to voltages which alternate about a reference value, and the term "ac coupling" or "ac coupled" refers to a signal condition in which the deviation of the peak values of the voltage or current from the reference value depends upon the average value of the signal itself, which condition may be achieved by passing the signal through a circuit which does not respond to direct current, such as a series capacitor or a transformer. Such ac coupling may be desirable, for example, in order to simplify the design of the preamplifier. When the signal is ac coupled, it is possible to introduce errors into the data decision process which are attributable to changes in the average value of the digitial signal which result from duty cycle changes of the signal. The duty cycle changes in turn result from the different patterns of logic ones and logic zeroes which carry the message information.

It is possible to select data codes which eliminate direct and low-frequency components of the signal. With the direct components elminated from the signal, the signal received by the detector may be ac coupled to the bit decision circuit without perturbations attributable to signal information content. However, when very high data rates are involved, the use of such specialized coding may not be cost-effective, because increased channel bandwidth is required.

In a burst mode system such as a local area network system, it may not be possible to maintain constant duty cycle. Even if each burst or packet of data individually has constant duty cycle, their indeterminate times of arrival may result in variations of the signal baseline.

As the bandwidth of the data signal is increased, fewer bit decision circuits are available which operate reliably at the signal frequencies corresponding to the upper end of the signal bandwidth. At the current state of the art, bit decisions are reliably made at signal frequencies approaching 1.1 GHz by gallium arsenide (GaAs) OR or NOR integrated circuit gates. These gates are of the ECL (emitter coupled logic) types, which are adapted to receive signal in a voltage range extending from about zero volts to approximately $-2.6$ volts. The OR/NOR gates compare the magnitude of the received signal with an internally generated threshold voltage, which has a value of approximately $-1.3$ volts. When it is desired to use such a gate as a data decision circuit, variations in the duty cycle of the signal pulses may cause average value perturbations which affect the reliability of the data decisions if the signal is ac coupled. It is desired to use logic gates with internal thresholds to make bit decision, and to ac couple signal from the detector to the logic gate.

SUMMARY OF THE INVENTION

A receiver for receiving ac coupled binary data which may have a variable duty cycle includes a controllable offset voltage generator, an input terminal of which is adapted to be coupled to the source of binary data. The offset voltage generator also includes an output terminal and establishes an offset voltage between input and output terminals under the control of a control signal. The receiver includes a positive excursion detector which responds to excursions of applied data having a positive polarity relative to a positive average value, and also includes a negative excursion detector for responding to excursions of applied data having a negative polarity relative to a negative average value. The positive and negative excursion detectors are ac coupled to receive the data for forming the positive average values and the negative average value. An adding or summing circuit sums together the positive and negative average values and applies the sum to the offset voltage generator for control of the offset voltage thereof in such a manner as to correct the average value of the binary data. A comparator or bit decision circuit is coupled to the output of the offset voltage generator for receiving therefrom binary data, the average value of which is compensated for duty cycle variations. The comparator compares the offset binary data with a fixed reference voltage for generating decided data therefrom.

DESCRIPTION OF THE DRAWING

FIGS. 2a–2f are amplitude-versus-time plots of various voltages and currents occurring in the arrangement of FIG. 1 during operation, illustrating the effect of changes in duty cycle;

FIGS. 3a–3f are amplitude-versus-time diagrams of data pulses having various average values, illustrating the effect of changes in average value on the timing of the decided data;

DETAILED DESCRIPTION OF THE INVENTION

Figure 1:
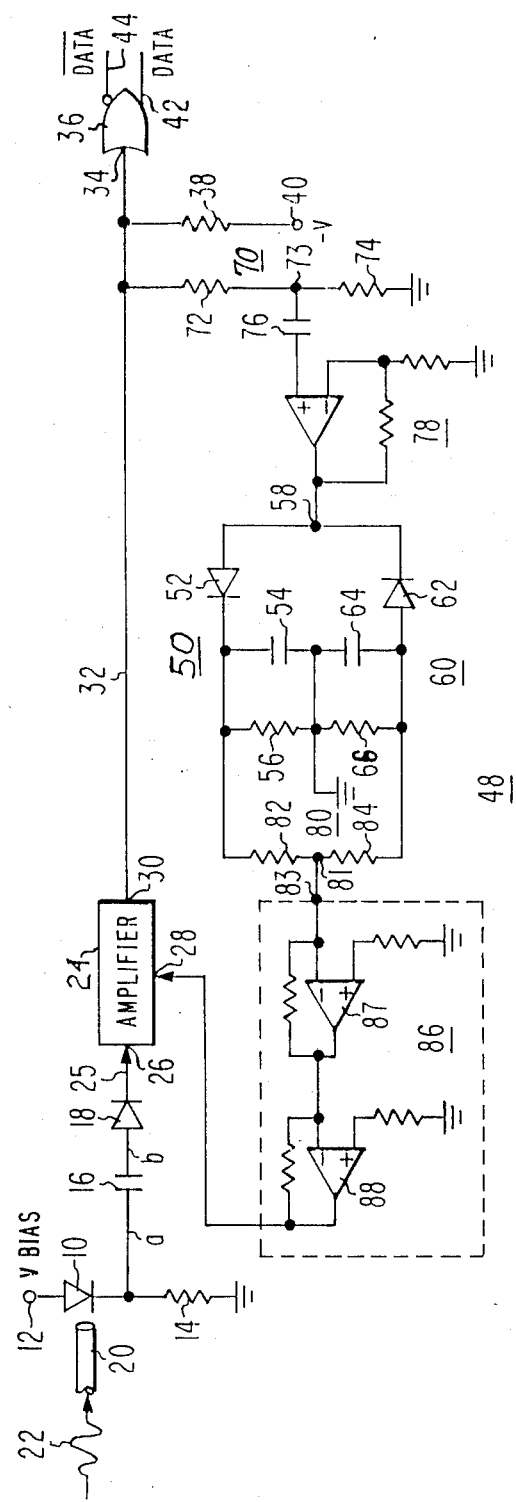
FIG. 1 is a diagram, partially in schematic and partially in block form, illustrating an optical data receiver 8 according to an embodiment of the invention.

FIG. 1 is a diagram in block and schematic form of an optical data received 8 according to an embodiment of the invention. In FIG. 1, a photodiode 10 has its anode connected to a voltage source terminal 12 for receiving bias voltage therefrom, and has its cathode connected by way of a resistor 14 to ground to provide a sink for bias current. Photodiode 10 may be of the avalanche type, whereupon the bias voltage at terminal 12 is a negative voltage selected to reverse bias the diode. A typical bias voltage is −150 volts. The cathode of photodiode 10 is also connected by way of a conductor designated a, by way of a dc (direct current) blocking capacitor 16, and by a conductor b to the input of a preamplifier 18. The input terminal of preamplifier 18 has a finite impedance to ground so that the voltage on conductor b goes to ground in the absence of a signal input. Photodiode 10 is also optically coupled to a fiber optic cable, a portion of which is illustrated as 20, for receiving therefrom data modulated light illustrated by symbolic arrow 22. Photodiode 10 responds to the data modulation of the light and produces electrical signal which is amplified by preamplifier 18 and applied to a further amplifier illustrated as a block 24. Amplifier 24 receives preamplified signals at an input terminal 26 and also receives offset voltage control signal at a further input terminal 28, and produced at an output terminal 30 amplified data signals superimposed on a selected direct voltage. The amplified data signals and superimposed direct voltage at output terminal 30 of amplifier 24 are applied over a conductor 32 or, if desired, over a transmission line including conductor 32, to an input terminal 34 of an integrated circuit logic gate 36. Logic gate 36 compares the ac coupled signal superimposed on a selected direct current which is applied to input terminal 34 with an internally generated reference voltage, which may be for example about −1.3 volts, as described above, if gate 36 is ECL compatible. Gate 36 decides, based upon this comparison, that the logic level applied to its input terminal is either a logic high or a logic low, and couples the decision to the data output conductor 42, and also produces a corresponding $\overline{\text{data}}$ signal on an output conductor 44. A pull-down resistor 38 is connected to conductor 32 and also to a terminal 40 to which a pull-down voltage −V is applied, for pulling the voltage at input terminal 34 of logic gate 36 to a particular value near the internal threshold value in the absence of an input signal, so that small-amplitude data signals may reliably trigger the data decision circuit. The magnitude of resistor 38 may be set to some value, such as 50 ohms, to provide a termination matched to the characteristic impedance of the transmission line when conductor 32 is part of a transmission line.

The rest voltage on the conductor designated a in the absence of a light input to photodiode 10 is a few millivolts negative with respect to ground, due to dark current of photodiode 10. When a light signal is applied, photodiode 10 produces electron-hole pairs, the holes of which are attracted towards terminal 12, and the electrons of which flow to ground through resistor 14, to produce signal voltage which is more negative than the no-signal voltage. Thus, during a light pulse, the voltage on conductor designated a goes negative from the rest value of a few millivolts negative relative to ground. Waveform 210 of FIG. 2a represents the signal voltage or current on conductor a in response to various information signals producing different duty cycles. The most positive portion of signal 210 is essentially at ground, and the signal is negative-going relative to ground. Variations in the duty cycle of the pulses of the data signal may cause variations of the average value of the signal, with a consequent change in the peak values. As illustrated in FIG. 2a in the interval T0–T2, waveform 210 is at its positive extreme value (ground) for approximately the same total length of time as it is at its negative extreme value, and therefore its average value lies approximately midway between the extreme values, at some negative voltage approximately half way between zero volts and the negative extreme value. FIG. 2b represents by a waveform 212 the voltage which is ac coupled to conductor b and to the input terminal of amplifier 18 by dc blocking capacitor 16. As mentioned, in the absence of an ac signal input, conductor b is at ground potential due to the finite input impedance of preamplifier 18. In the interval T0–T2, waveform 212 makes excursions above and below zero voltage, the excursions being of equal amplitude and of the same duration. Thus, the positive and negative extreme values of the alternating current signal are equidistant from ground in the interval T0–T2.

In the interval T2–T4, received signal 210 appearing on the conductor designated a dwells at its more positive excursion for longer periods of time than it dwells at its more negative excursion. Consequently, its average value is closer to the positive extreme value than to its negative extreme value. The signal coupled to conductor b by capacitor 16 in the interval T2–T4, as illustrated in FIG. 2b, has negative extreme values greater than the positive extreme values as measured from zero volts or ground reference.

FIGS. 2a and 2b illustrate in the interval T4–T6 the effect of signals having a duty cycle causing the signal to dwell for a greater proportion of the time at a negative average value. Signal 210 of FIG. 2a assumes its negative extreme value over most of the interval T4–T6. The corresponding signal on conductor b as illustrated by waveform 212 of FIG. 2b has a positive extreme value relative to zero volts greater than the negative extreme value. If the signal magnitudes are small, such changes in the peak magnitudes of the ac coupled signal may result in failure of the data decision circuit to detect a transition. Furthermore, such ac coupling of data signals may result in errors in the received timing.

FIG. 3a illustrates a portion of a data signal 310 having equal positive and negative excursions relative to a zero volt average value. Signal 310 as illustrated has finite rise and fall times much like those of an actual high frequency signal. The leading and lagging edges of the waveform cross the zero volt axis at times such as T0, T2, T4 . . . FIG. 3b illustrates as a square wave 312 the result of applying signal 310 to a data decision circuit which makes a transition at each crossing of the zero volt axis. As illustrated in FIG. 3b, waveform 312 makes a positive-going transition at time T0, and a negative-going transition at a time T2. FIG. 3c illustrates a waveform 314 which for illustrative purposes is identical to waveform 310, except that the positive-going signal extremes are further from the zero volt axis than the negative-going extremes. Such a condition might occur on a transient basis in an ac coupled circuit. FIG. 3d illustrates as a waveform 316 the result of applying waveform 314 to the data decision circuit which compares the signal level with zero volts. As illustrated, the positive-going transitions of waveform 316 occur at a time T0′ which is earlier than time T0, and the negative-going transitions occur at a time T2″, later than time T2. FIG. 3e illustrates as a waveform 318 a signal similar to waveform 310 but in which the negative extreme values are greater than the positive extreme values relative to the zero volt reference. FIG. 3f illustrates as a waveform 320 the result of applying signal 318 to a data decision circuit which compares the signal level with a zero volt reference. As illustrated in FIG. 3f, signal 320 makes a positive-going transition at a time T0″ later than time T0, and makes a negative-going transition at a time T2′, earlier than time T2. Other transitions are similarly displaced in time. Thus, the changes in average value and excursion amplitude as a result of ac coupling may also affect the timing of the recovered waveform. Such changes in timing may adversely affect the ability of a signal processor to process the signals, and may result in an increase in the bit error rate (BER).

Referring once again to FIG. 1, data receiver 8 includes a compensating signal generator designated generally as 48, which comprises a positive detector designated generally as 50. Detector 50 includes a diode 52 having its cathode connected to an averaging or smoothing capacitor 54, the other end of which is connected to ground. A resistor 56 is connected across capacitor 54. A negative peak detector designated generally as 60 includes a diode 62 having its cathode connected to the anode of diode 52 at a junction 58. The anode of diode 62 is connected to one end of an averaging capacitor 64, the other end of which is connected to ground. A resistor 68 is connected across capacitor 64. A sample of the signal on conductor 32 is generated by a voltage divider designated generally as 70 coupled between conductor 32 and ground. Voltage divider 70 includes a resistor 72 serially connected with a resistor 74, and produces the signal sample at a junction 73. A capacitor 76 has one end connected to junction 73 of resistors 72 and 74 for ac coupling the signal sample to a noninverting buffer amplifier designated generally as 78. The output of amplifier 78 is connected to junction point 58 for applying the ac coupled signal sample to positive detector 50 and negative detector 60. Diode 52 conducts when the positive excursion of the ac coupled signal voltage at junction 58 exceeds the average voltage across capacitor 54. Diode 62 conducts when the negative excursion of the ac coupled signal voltage at junction 58 exceeds the average voltage across capacitor 64. The average signals produced across capacitors 54 and 64 in response to the ac coupled signal sample are applied to a summing circuit designated generally as 80. Summing circuit 80 includes a resistor 82 connected between the cathode of diode 52 and a junction point or summing terminal 81, and a further resistor 84 connected between the anode of diode 62 and junction 81. The sum of the positive and negative average values appears at terminal 81 and is applied to the low impedance input terminal 83 of a noninverting amplifier designated generally as 86. Amplifier 86 includes a first inverting feedback amplifier 87 cascaded with a second inverting feedback amplifier 88. The output signal from amplifier 86 is applied to terminal 28 for control of the threshold level on which the output signal of amplifier 24 rides.

In operation, compensating signal generator 48 samples the data signal on conductor 32 and ac couples it through amplifier 78 to junction point 58 with positive and negative peak excursions which vary in dependence upon the duty cycle of the signal, as illustrated by waveform 212 of FIG. 2b. As a result, during those intervals in which the data signal has equal positive and negative extreme values, positive detector 50 and negative detectors 60 generate approximately the same magnitude of direct voltage across their capacitors 54 and 64, respectively, as illustrated by waveforms 214 and 216 of FIGS. 2c and 2d, respectively, in the interval T0–T2. With equal positive and negative voltages across capacitors 54 and 64, the sum value at summing terminal 81 is zero volts relative to ground, as illustrated by waveform 218 of FIG. 2e in the interval T0–T2. During those intervals when the duty cycle of the signal on conductor 32 in such that the signal level dwells longer near its positive extreme value than at its negative extreme value, as illustrated in the interval T2–T4 in FIG. 2a, the magnitude of the positive voltage across capacitor 54 will be smaller than the magnitude of the negative voltage across capacitor 64, as illustrated by waveform 214 and 216 of FIGS. 2c and 2d, respectively. Under this condition, the sum voltage at summing terminal 81 will assume a net negative value, as illustrated by sum waveform 218 of FIG. 2e in the interval T2–T4. When the signal voltage on conductor 32 dwells at its more negative value for a longer period of time that at its positive value, as illustrated by waveform 210 in the interval T4–T6 of FIG. 2a, the positive voltage across capacitor 54 will assume a greater value than the negative voltage across capacitor 64 as illustrated by waveforms 214 and 216 of FIGS. 2c and 2d, respectively, in the interval T4–T6. As a result, the sum voltage at summing terminal 81 takes on a positive value. Thus, the duty cycle of the signal ac coupled to conductor 32 results in voltage variations at summing terminal 81. These voltage variations are amplified by amplifier 86 and coupled to offset voltage input terminal 28 of amplifier 24 in the proper polarity and with a magnitude selected to compensate for the effect of the duty cycle variations on the average level of the signal applied to input terminal 34 of logic gate 36. The compensated signal is illustrated by waveform 220 of FIG. 2f. The compensation corrects for the amplitude and timing errors introduced by ac coupling of the signal. It should be noted that the arrangement of FIG. 1 is not a degenerative feedback loop but rather is a open-circuit compensating loop.

In a particular embodiment of the invention, amplifier 24 is a type CLC104AI dc-1.1 GHz 3 dB bandwidth, 14dB gain amplifier having input and output impedances of 50 ohms, which is manufactured by Comlinear Corporation, 2468 East 9th Street, Loveland, Colo. 80537. Gate 36 is a type 11101-2 gallium arsenide OR/-NOR gate (an OR gate having both noninverting and inverting outputs) manufactured by Harris Microwave Semiconductor Corporation, 1530 McCarthy Boulevard, Milpitas, Calif. 95035. This type of gate has a finite input impedance, and compares the applied signal with an internally generated −1.3 volt reference threshold. In order to set the voltage at input terminal 34 at −1.3 volts, pull-down resistor 38 is selected to have a value of approximately 50 ohms, and the voltage applied to terminal 40 is approximately −2.6 volts. Amplifier 78 in this embodiment is a 100 Mz bandwidth National Semiconductor type LH0032 ultrafast operational amplifier (Op Amp). This Op Amp has a bandwidth which is not commensurate with the bandwidth of the signal, but it provides enough signal amplification to operate the positive and negative detectors.

Figure 4:
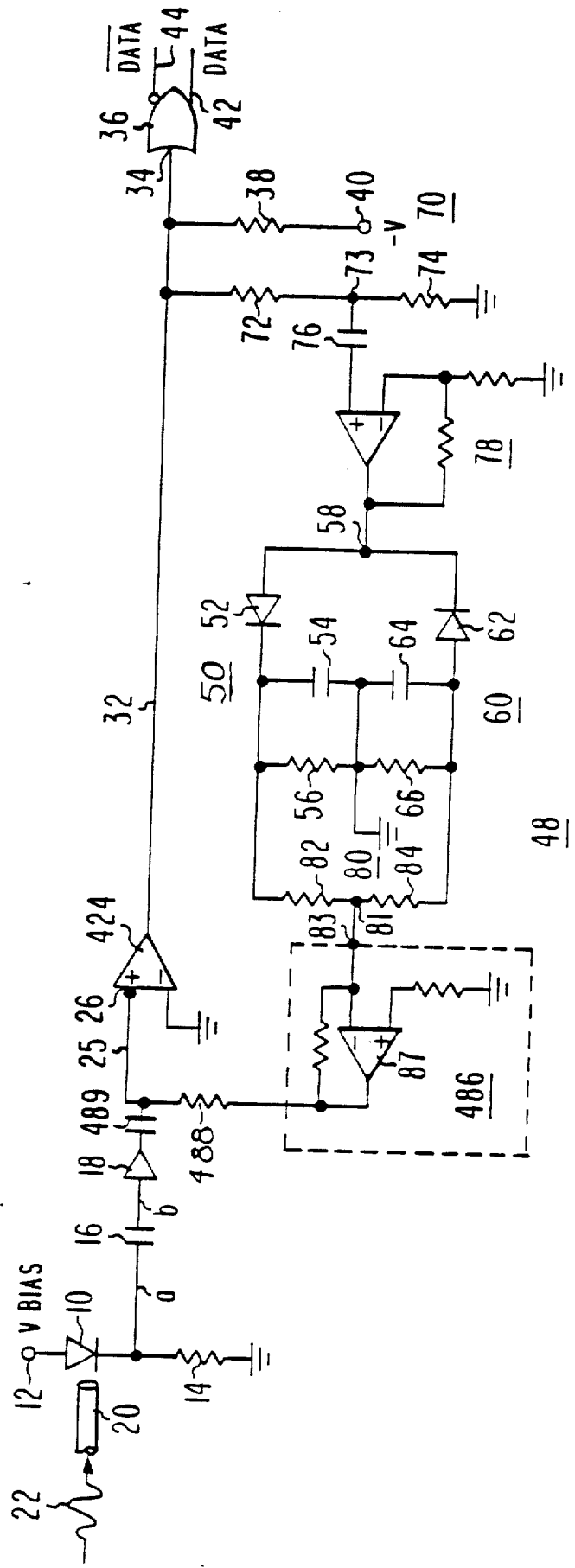
FIGS. 4, 5 and 6 are diagrams similar to FIG. 1 illustrating other embodiments of the invention.

FIG. 4 illustrates another embodiment of the invention. In FIG. 4, elements corresponding to those of FIG. 1 are designated by the same reference numeral. FIG. 4 differs from the arrangement of FIG. 1 in that amplifier 24 of FIG. 1 is replaced by an operational type amplifier 424 having an input impedance which is higher than 50 ohms at both its inverting and noninverting input terminals. Amplifier 424 has its inverting input terminal connected to ground and its noninverting input terminal coupled to conductor 25 to receive ac coupled signal from preamplifier 18. The coupling of the sum voltage at summing terminal 81 is accomplished by an inverting amplifier 486, which is simply amplifier 86 of FIG. 1 with amplifier 88 removed therefrom. The output of amplifier 486 is coupled to conductor 25 and to the noninverting input terminal of amplifier 424 by means of a resistor 488. Resistor 488 applies the direct compensating voltage from amplifier 486 to conductor 25, thereby superposing the compensation voltage on the ac coupled signal. The compensation voltage is of such a polarity as to compensate for the effects of changes in duty cycle on the average value of the signal. Amplifier 424 amplifies the signal and the compensation voltage, which in general results in a direct voltage transition between the input and output terminals.

Figure 5:
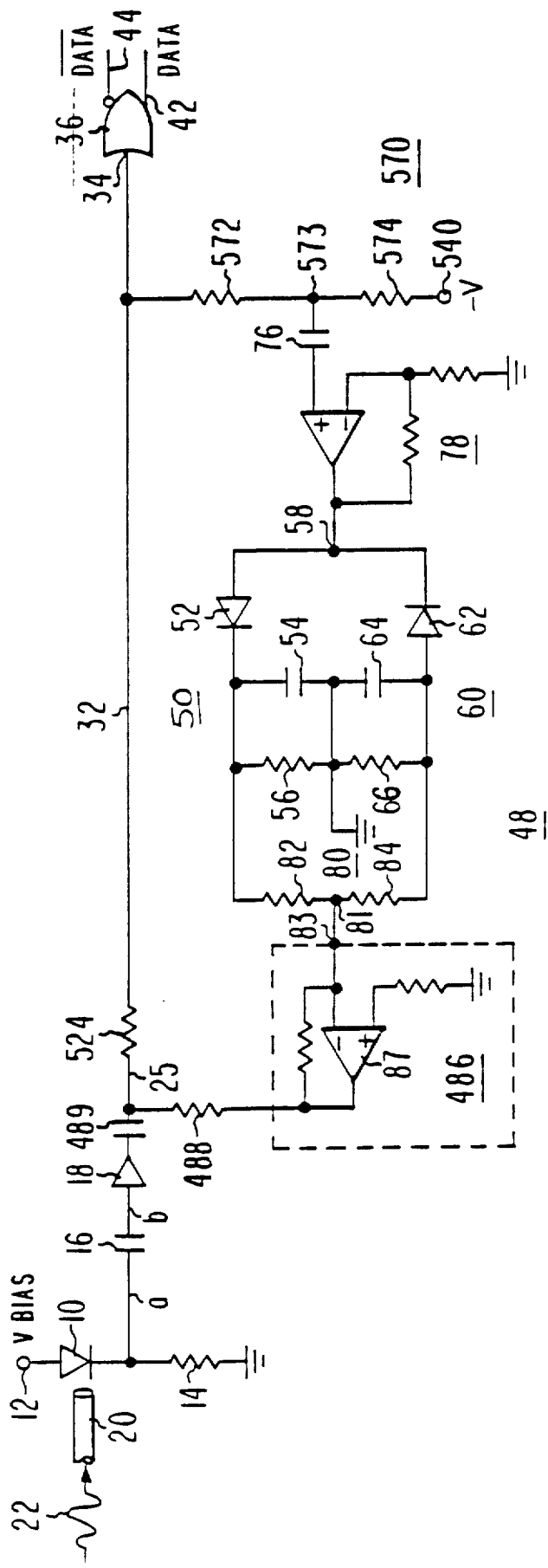

FIG. 5 illustrates another embodiment of the invention. Elements of FIG. 5 corresponding to those of FIG. 4 are designated by the same reference numeral. FIG. 5 differs from the arrangement of FIG. 4 in that the only amplification of the received signal is by preamplifier 18. Amplifier 424 is replaced by a resistor 424 connected to conductor 25 and to input terminal 34 of gate 36. Resistor 524 provides an impedance which separates the input and output connects of compensation signal generator 48. Signal preamplified by preamplifier 18 is applied through capacitor 489 and resistor 524 to input terminal 34. Resistor 38 as illustrated in FIG. 4 is eliminated and its function of applying a threshold voltage to input terminal 34 is provided by voltage divider 570, the resistors 572 and 574 of which are connected to a terminal 540 for receiving a bias voltage. The sum of resistors 572 and 574 is selected to equal the characteristic impedance of the transmission line of which conductor 32 is a part. The signal is attenuated by the division ratio of a voltage divider formed by resistor 524, and resistors 572 and 574. The signal level arriving at input terminal 34 of gate 36 will therefore be lower than that in FIG. 4, unless the gain of preamplifier 18 is increased. The gain of amplifiers 78 and 486 may need to be higher in the arrangement of FIG. 5 than in FIG. 4, to compensate for th decrease of signal amplitude applied to detectors 50 and 60.

Figure 6:
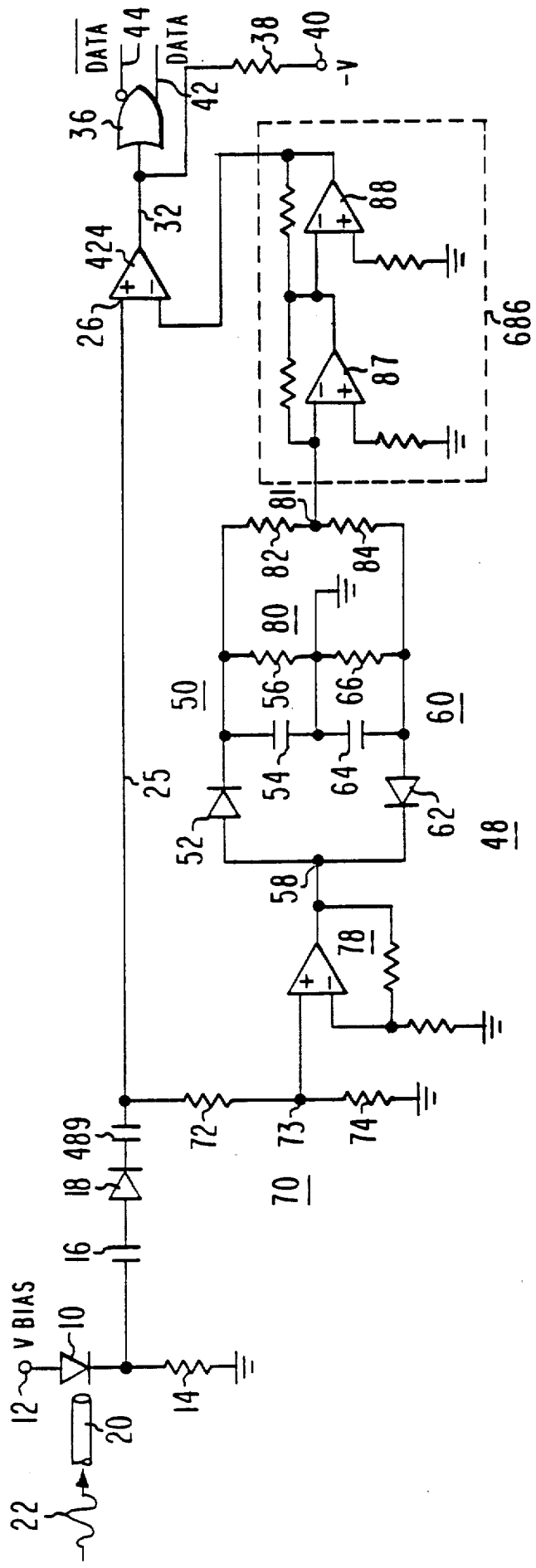

The arrangement of FIG. 6 illustrates another embodiment of the invention similar to that of FIG. 4. Elements of FIG. 6 corresponding to those of FIG. 4 are designated by the same reference numeral. In FIG. 6, the correction signal generated by correction signal generator 48 is applied to the inverting input terminal of amplifier 424. Also, the ac signal input to correction signal generator 48 is taken from conductor 25 at the input of amplifier 424, as opposed to being taken from conductor 32 at the output of amplifier of 424. Since the correction signal is applied to the inverting input of amplifier 424 rather than to the inverting input as in FIG. 4, a phase inversion of the control signal is required to make the polarity of the control signal such as to correct for the effects of dc coupling. Consequently, the sum signal at output terminal 81 is applied to the inverting input terminal of amplifier 424 by way of an inverting amplifier 686. It should be noted that capacitor 76 which couples junction 73 of voltage divider 70 to junction 58 of diodes 52 and 62 has been dispensed with. Other embodiments of the invention will be apparent to those skilled in the art. For example, other types of logic gates or comparators may be used rather than OR/NOR gate 36. Resistive voltage divider 70 and capacitor 76 (FIG. 1) may be relaced by a capacitive voltage divider. Diodes 52 and 62 may be replaced by active detectors or rectifiers, which are advantageous because of their low threshold voltages. While the illustrated arrangements receive their data signal from an optical fiber, the data signal may be received by an antenna in the form of modulated carrier, or may be received over an electromagnetic transmission line.

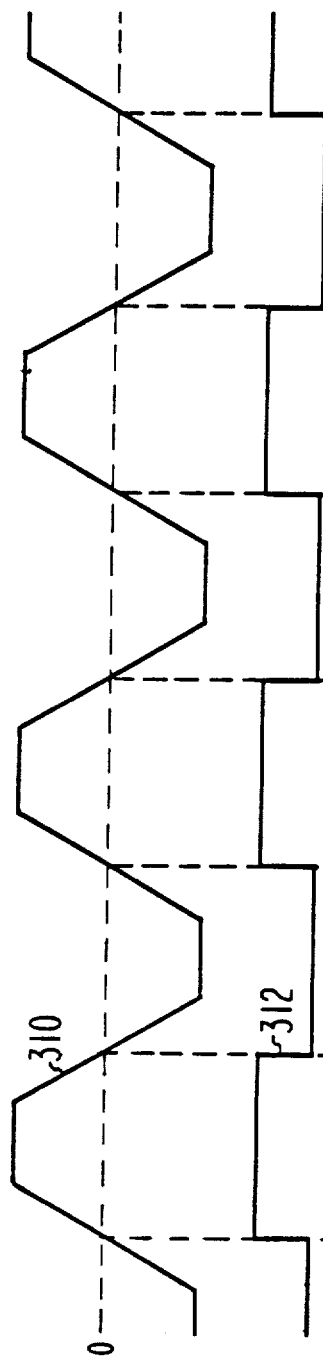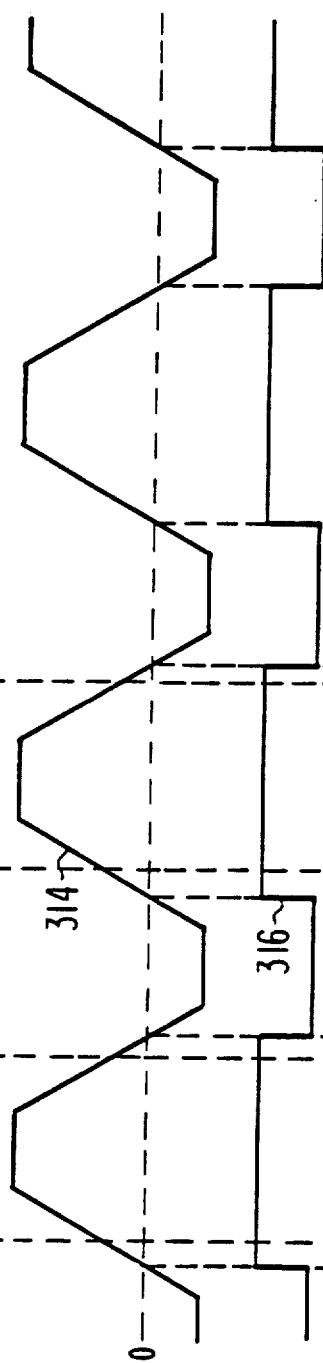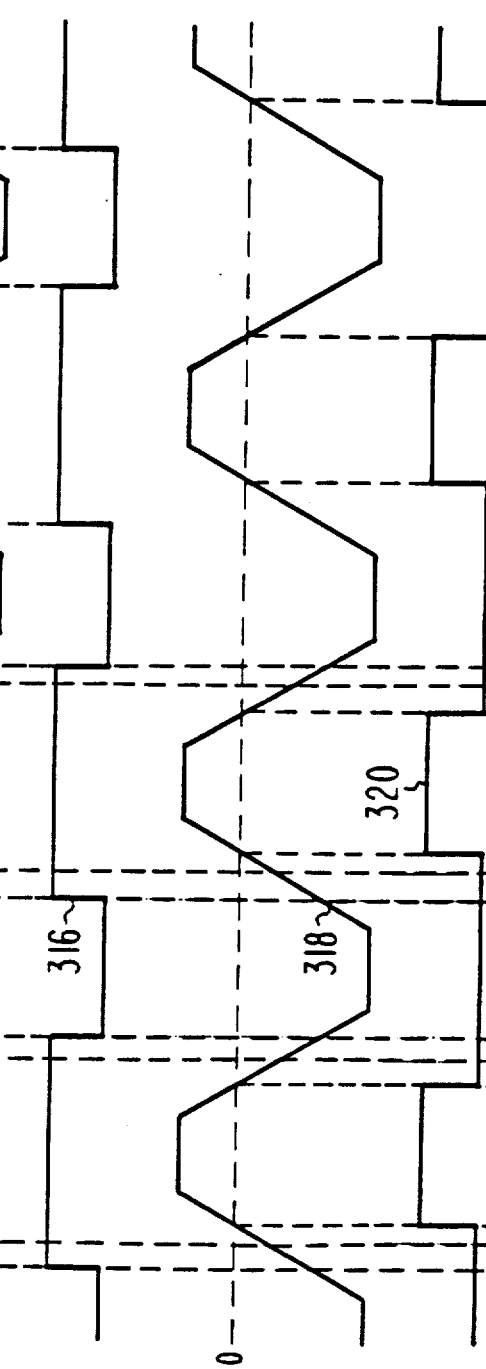

What is claimed is:

1. A receiver for receiving ac coupled binary data having a variable duty cycle, comprising:
controllable offset voltage generating means including an input terminal adapted to be coupled to said source of binary data and also including an output terminal for establishing a direct offset voltage between said input and output terminals under the control of a correction signal, to thereby generate offset binary data;
positive detection means including input and output terminals for responding to excursions of applied data in a positive polarity relative to a positive average value generated at said output terminal of said controllable offset voltage generating means in response to said applied data;
negative detection means including input and output terminals for responding to excursions of applied data in a negative polarity relative to a negative average value generated at said output terminal of said controllable offset voltage generating means in response to said applied data;
alternating current coupling means coupled to one of said input and output terminals of said controllable offset voltage generating means and to said input terminals of said positive detection means and of said negative detection means for applying said binary data thereto for forming said positive average value at said output terminal of said positive detection means and said negative average value at said output terminal of said negative detection means, said positive average value and said negative average value being perturbed in response to duty cycle changes of said binary data;
summing and coupling means coupled to said output terminals of said positive detection means and of said negative detection means, and to said controllable offset voltage generating means for summing together said positive average value and said negative average value to form said correction signal, and for coupling said correction signal to said controllable offset voltage generating means with a polarity selected for open-circuit correction for controlling said offset voltage in a manner tending to hold a point midway between excursion extremes of said offset binary data at a constant voltage regardless of said duty cycle; and
comparator means coupled to said output terminal of said controllable offset voltage generating means for comparing said offset binary data with a fixed reference voltage for generating decided data therefrom.

2. A receiver according to claim 1 wherein said controllable offset voltage generating means comprises impedance means presenting an impedance to said source of binary data.

3. A receiver according to claim 2 wherein said impedance means comprises an amplifier including first input and output terminals, and said first input and output terminals of said amplifier correspond to said input and output terminals of said controllable offset voltage generating means.

4. A receiver according to claim 3, wherein said amplifier comprises a second input terminal, said second input terminal being coupled to said summing and coupling means for receiving said correction signal for controlling the offset level of said output terminal of said amplifier.

5. A receiver according to claim 4, wherein said amplifier comprises resistance means, said resistance means being coupled between said first and second input terminals of said amplifier, for coupling said control signal to said first input terminal of said amplifier.

6. A receiver according to claim 2 wherein said impedance means comprises:
first resistance means including first and second terminals, said first and second terminals of said first resistance means corresponding to said input and output terminals, respectively, of said controllable offset voltage generating means; and
second resistance means coupled to said first terminal of said first resistance means and to said summing and coupling means for coupling said control signal to said first terminal of said first resistance means.

7. A receiver according to claim 1 wherein said receiver is an optical data receiver which comprises a photodetector.

* * * * *

UNITED STATES PATENT AND TRADEMARK OFFICE
CERTIFICATE OF CORRECTION

PATENT NO. : 4,736,391

DATED : April 5, 1988

INVENTOR(S) : Stefan A. Siegel

It is certified that error appears in the above-identified patent and that said Letters Patent is hereby corrected as shown below:

The sheets of Drawings consisting of Figures 3a-3f, 4, 5 and 6 should be added as per attached sheets.

Signed and Sealed this

Eighteenth Day of April, 1989

Attest:

DONALD J. QUIGG

Attesting Officer

Commissioner of Patents and Trademarks